United States Patent
Libby et al.

(10) Patent No.: US 7,180,489 B2
(45) Date of Patent: *Feb. 20, 2007

(54) AUTOMATED MULTI-TASK WINDOW ASSEMBLY

(75) Inventors: James B. Libby, Stillwater, MN (US); Rodney K. Williams, Stacy, MN (US); Oscar E. Pena A, London (GB); Alex W. K. Tan, Eindhoven (NL); Anthony J. Lightfoot, White Bear Lake, MN (US)

(73) Assignee: Andersen Corporation, Bayport, MN (US)

( * ) Notice: Subject to any disclaimer, the term of this patent is extended or adjusted under 35 U.S.C. 154(b) by 363 days.

This patent is subject to a terminal disclaimer.

(21) Appl. No.: 10/397,084

(22) Filed: Mar. 26, 2003

(65) Prior Publication Data

US 2004/0056829 A1   Mar. 25, 2004

Related U.S. Application Data

(63) Continuation-in-part of application No. 10/068,686, filed on Feb. 6, 2002, now Pat. No. 7,109,959.

(51) Int. Cl.
*G09G 3/36* (2006.01)
*E05B 65/04* (2006.01)

(52) U.S. Cl. .............................. 345/87; 49/63; 49/501; 40/789

(58) Field of Classification Search .................. 345/87, 345/905; 348/794; 40/789; 49/63, 501, 49/130
See application file for complete search history.

(56) References Cited

U.S. PATENT DOCUMENTS

| 3,801,943 | A |   | 4/1974  | Bertagni ............ 335/231 |
| 3,896,589 | A | * | 7/1975  | Mitchell ............ 49/425 |
| 4,050,189 | A | * | 9/1977  | Peterson ............ 49/26 |
| 4,434,579 | A |   | 3/1984  | Murphy |
| 4,561,619 | A |   | 12/1985 | Robillard et al. ...... 248/285 |
| 4,735,467 | A |   | 4/1988  | Wolters ............ 312/29 |
| 4,836,478 | A |   | 6/1989  | Sweere ............ 248/1 |
| 4,926,486 | A |   | 5/1990  | Barsumian ......... 381/152 |
| 5,007,707 | A |   | 4/1991  | Bertagni ............ 350/118 |
| 5,253,051 | A | * | 10/1993 | McManigal .......... 348/121 |
| 5,374,104 | A |   | 12/1994 | Moore et al. ....... 297/188.16 |
| 5,400,414 | A |   | 3/1995  | Thiele ............ 381/190 |
| 5,538,310 | A |   | 7/1996  | Frankhouse et al. .. 296/97.4 |
| 5,687,939 | A |   | 11/1997 | Moscovitch ......... 248/122.1 |

(Continued)

FOREIGN PATENT DOCUMENTS

DE    201 13 157 U1    1/2002

(Continued)

*Primary Examiner*—Jimmy H. Nguyen
(74) *Attorney, Agent, or Firm*—Womble Carlyle Sandridge & Rice, PLLC

(57) ABSTRACT

A window assembly includes a window frame defining a frame perimeter and at least one window mounted in the frame. A media panel incorporating a video display is associated with the window assembly and can be moved selectively into the frame perimeter for displaying video information and out of the frame perimeter for storage when not in use. A motorized transport mechanism is coupled to the media panel for selectively and automatically moving the media panel between its storage and operational positions.

22 Claims, 3 Drawing Sheets

U.S. PATENT DOCUMENTS

| | | | |
|---|---|---|---|
| 5,701,359 A | 12/1997 | Guenther et al. | 381/203 |
| 5,732,919 A | 3/1998 | Rosen et al. | 248/274.1 |
| 5,793,877 A | 8/1998 | Tagg | 381/156 |
| 5,941,488 A | 8/1999 | Rosen | 248/278.1 |
| 6,007,036 A | 12/1999 | Rosen | 248/286.1 |
| D418,831 S | 1/2000 | Rosen et al. | D14/126 |
| 6,144,417 A * | 11/2000 | Yanagisawa | 348/823 |
| 6,160,898 A | 12/2000 | Bachmann et al. | 381/425 |
| 6,189,849 B1 | 2/2001 | Sweere et al. | 248/286.1 |
| 6,275,598 B1 | 8/2001 | Bachmann et al. | 381/425 |
| 6,286,794 B1 | 9/2001 | Harbin | 248/123.2 |
| 6,347,149 B1 | 2/2002 | Bachmann et al. | 381/396 |
| 6,352,226 B1 | 3/2002 | Gordon | 248/125.2 |
| 6,373,215 B1 | 4/2002 | Grabmaier et al. | 318/483 |
| 6,388,404 B1 | 5/2002 | Schnebly et al. | 318/16 |
| 6,389,935 B1 | 5/2002 | Azima et al. | 81/388 |
| 6,397,504 B1 | 6/2002 | McFetridge | 40/591 |
| 6,397,972 B1 | 6/2002 | Bank et al. | 181/148 |
| 6,407,468 B1 | 6/2002 | LeVesque et al. | 307/10.1 |
| D460,055 S | 7/2002 | Rosen | D14/126 |

FOREIGN PATENT DOCUMENTS

| | | |
|---|---|---|
| FR | 2 434 540 | 4/1980 |
| WO | WO 00/02417 | 1/2000 |

* cited by examiner

AUTOMATED MULTI-TASK WINDOW ASSEMBLY

REFERENCE TO RELATED APPLICATION

This is a continuation-in-part of U.S. patent application Ser. No. 10/068,686 filed on Feb. 6, 2002 now U.S. Pat. No. 7,109,959.

TECHNICAL FIELD

This invention relates generally to fenestration and more specifically to window assemblies that provide information display and user interaction functions in addition to the functions of traditional windows.

BACKGROUND OF THE INVENTION

Windows have been used for centuries to provide ventilation and light for homes and buildings. Separately, various types of devices have more recently been employed in homes to display, for instance, entertainment programming and security camera video images and to provide user interface to home computers. Such devices include televisions for displaying broadcast as well as DVD and VCR entertainment programming and security monitors in some cases for displaying images from security cameras in and around a home or building. Computers also are ubiquitous among homeowners and they include separate video displays for displaying information and providing user interface with computer software programs. A problem arises in that all of these types of electronic equipment take up space and, for the most part, operate autonomously from one another. Further, they generally are located in separate parts of a home and thus are not accessible from any one location. It has been recognized by the inventors hereof that traditional windows provide an ideal opportunity for integrating the functions of these various types of electronic devices with the traditional functions of a window, all in one convenient location. For instance, it would be highly desirable and convenient for a homemaker to have access to entertainment programming, home security video displays, and computer functions while working in the kitchen, perhaps at the sink, all while enjoying a view through the kitchen window. It is to the provision of a window system that provides these and other desirable features that the present invention is primarily directed.

SUMMARY OF THE INVENTION

In accordance with one embodiment of the present invention, there is provided a window unit that includes a window frame defining a frame perimeter and a window located within the frame perimeter. The window unit includes a video display module incorporated into a sliding media panel and adapted to receive a video display signal from a video signal source and display the video to a user. The sliding panel can be slid sidewise into a wall pocket beside the window casing when not in use and can be slid out into view when needed. In one embodiment, the media panel is slid in and out of its pocket by a linear actuator or other motorized transport mechanism that can be activated manually or automatically.

Also in accordance with the present invention, there is provided a method that includes providing a window frame defining a frame perimeter and providing a window within the frame perimeter. A media panel mounted in the window frame includes a display module adapted to receive a display signal from a display signal source.

DETAILED DESCRIPTION OF THE PREFERRED EMBODIMENTS

Figure 1:
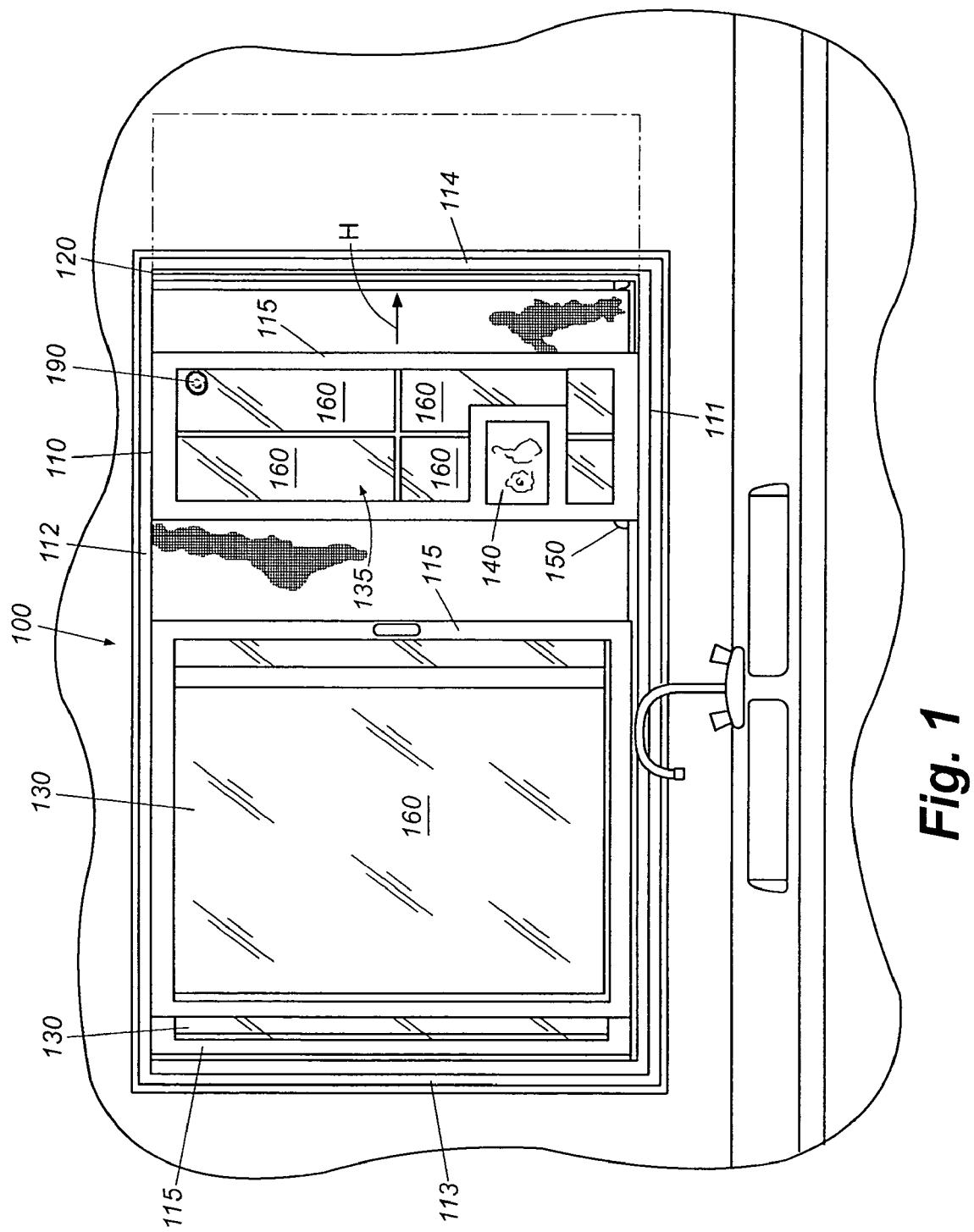
FIG. 1 is a front plan view of a window unit that incorporated principles of the present invention in one preferred form.

FIG. 1 is a plan view of a window unit in accordance with one embodiment of the invention. The window unit 100 includes a window casing or frame 110. The window frame 110 defines a window frame perimeter 120. Window sashes 130, are mounted in the window frame in the traditional way and, in the illustrated embodiment, are of the horizontally gliding sash variety. However, the window sashes 130 may, instead of gliding sashes, be any type of traditional window panels including, for example, casement windows or sealed glass picture windows. This invention is not limited to a particular type of window.

The window frame 110 may include two pair of opposed frame members. A first pair of opposed frame members includes a bottom frame member 111 and a top frame member 112 can be oriented along a horizontal rigid frame axis. A second pair of opposed rigid frame members includes a first side frame member 113 and a second side frame member 114 can be oriented along a vertical frame axis. The four frame members 111, 112, 113, 114 can generally form a square or rectangle shape. However, the window frame may be any shape.

The window unit 100 may be installed, for example, in an opening within a wall of a home or building for admission of light and air and may be closed by casements or sashes containing transparent, translucent, or opaque glass or other material and may or may not be capable of being opened or closed. Examples include a picture window, a bay window, a double-hung window, a skylight, egress window, an awning window, a casement window, a gliding window, and the like. The invention also may be incorporated into an interior window or, for instance, a mirror if desired.

A video display panel 135 (also referred to herein as media panel 135) is horizontally slidably mounted within the window frame and is provided with a video display 140 adapted to receive a video signal from a video signal source (not shown) and to display corresponding video images. The display 140 thus provides a visual display observable by a user in the vicinity of the window unit. The display 140 may be a liquid crystal display, a plasma display, a CRT display, or any other appropriate display, but preferably takes the form of a flat panel display of the type found in many modern computer systems.

The display signal may be a digital signal, an analog signal, a digital and analog signal, and the like. The display signal source (not shown) may be, for example, a television tuner, a VCR, DVD, computer, security camera, and the like. Alternatively, the video display may be part of a simple television that provides only TV programming.

The window unit 100 may include one or more windows, such as, for example, sashes, casements, fixed panes, a combination of sashes, casements and fixed panes, and the like. FIG. 1 illustrates a non-limiting example of a window unit 100 with two gliding sash window panels 130. The window panels 130 are shown with a frame 115 enclosing glass 160. However, the window panels 130 may include glass 160 without frames 115 and may take on any traditional form such as, for example, divided lights. The gliding window sashes are used in the normal way to close the window unit. In the illustrated embodiment, for example, one or both of the panels 130 are slid horizontally to open and close the window as desired.

As mentioned above, the media panel 135 incorporates the video display 140. The media panel 135 preferably is slidably mounted to the first pair of opposing frame members that comprise the bottom frame member 111 and the top frame member 112, which are oriented parallel to a horizontal window unit axis H. The media panel 135 may move along the horizontal window unit axis H between the second pair of opposing rigid frame members that the first side frame member 113 and the second side frame member 114. The media panel 135 may be slid horizontally into a storage location within a pocket (illustrated by phantom lines on the right of FIG. 1) when not in use in a manner similar to a traditional pocket door. When the media panel 135 is slid to its storage location within the pocket, it is positioned out-of-sight, and an unobstructed traditional view is provided through the windows 130.

The media panel 135 may include a tab 150 that protrudes slightly into the frame perimeter 120 when the media panel is in its storage location. The tab 150 may be a protrusion extending from the media panel 135. The tab 150 provides the user a convenient grasping device to slide the media panel 135 between its storage location within the pocket and an operational location within the frame of the window unit where its video display module 140 may be viewed by the user. The tab 150 also minimizes visual obstruction through the window unit 100 when the media panel is in its storage location.

The window unit 100 may also be provided with audio reproduction capabilities for producing the audio portion of a video entertainment or other program displayed on the video display 140. In this regard, the illustrated embodiment is provided with an audio transducer 190 that is mounted to a glass pane 160 of the media panel 135. The audio transducer 190, when activated by an audio signal, imparts vibrations to the glass pane, which, in turn, produces sound through flat panel distributed mode vibrations. The glass pane thus acts as a flat panel sound radiator to reproduce the audio portion of a video program. Such audio transducers and flat panel sound radiators in general are described in detail in various U.S. patents of New Transducers, Inc., Armstrong World Industries, Inc., and others. The disclosures of these patents are hereby incorporated by reference as if fully set forth herein. The audio transducer 190 can be located on or within the window pane 160 and, as mentioned, and operates in cooperation with the video display 140 to provide sound to accompany the video images.

Figure 2:
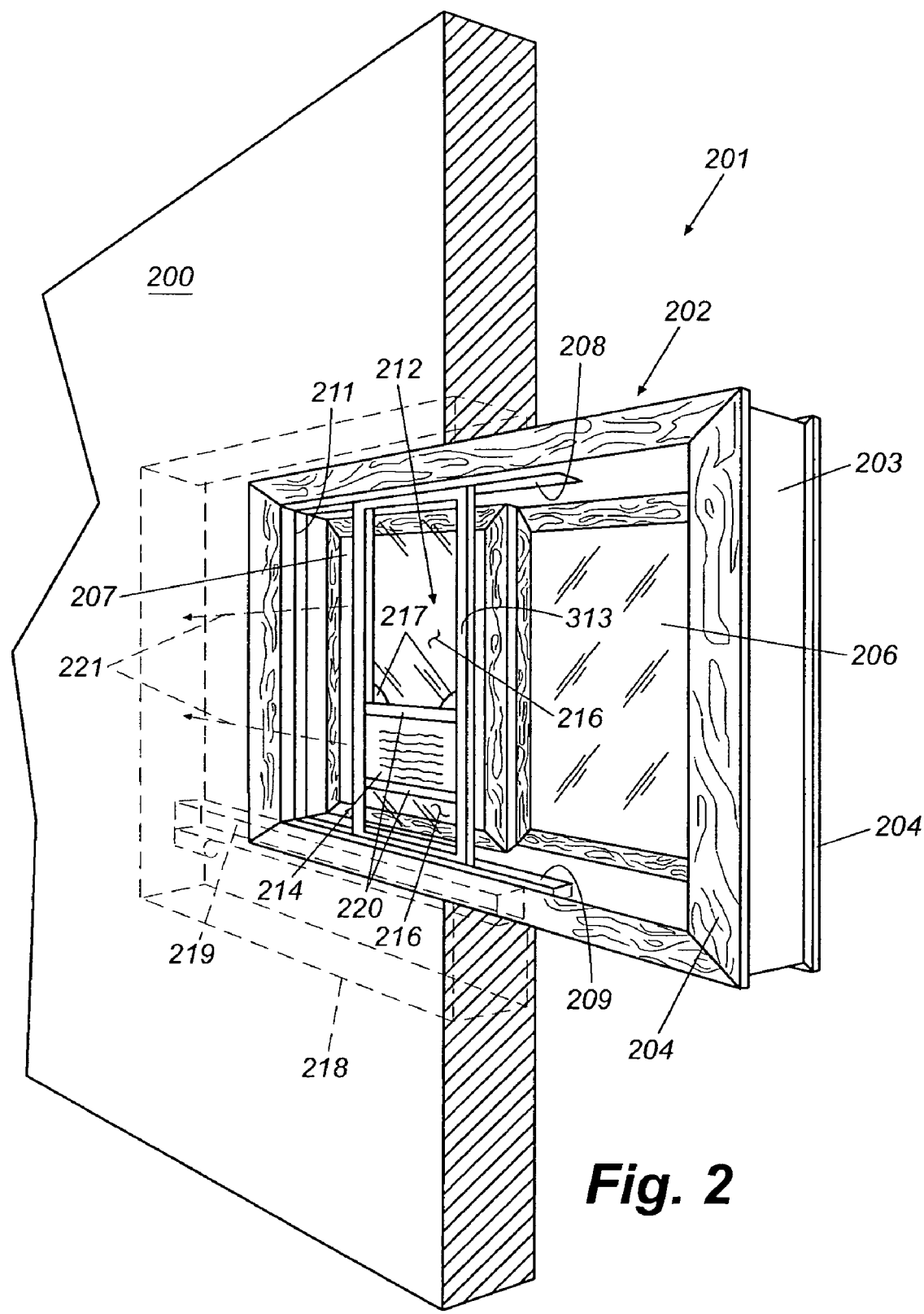
FIG. 2 is a perspective partially sectioned view of a window unit that incorporates principles of the invention in an alternate form.
Figure 3:
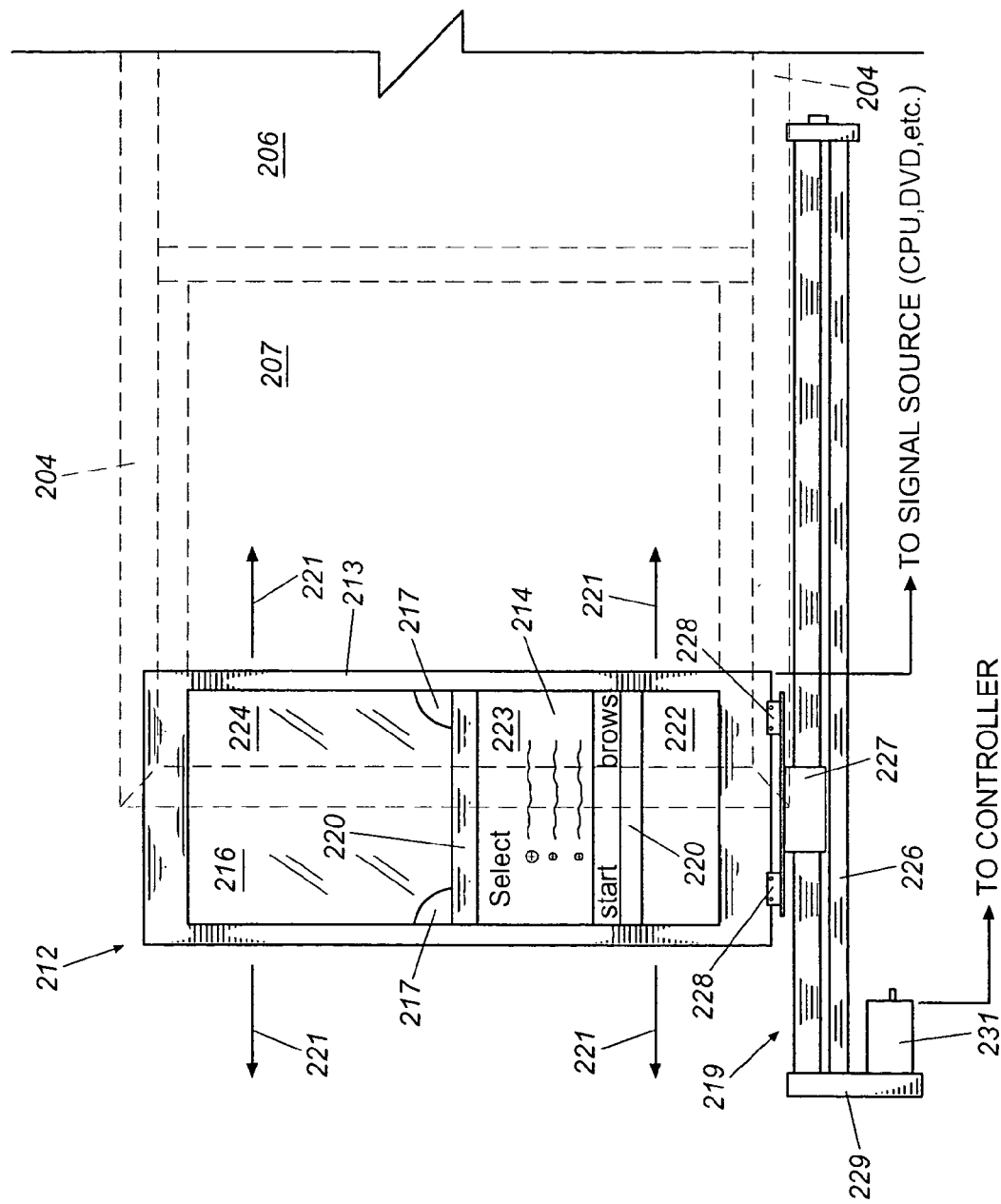
FIG. 3 is a front plan view of the window unit of FIG. 2 illustrating one embodiment of a powered transport mechanism for moving the video display module automatically between its stored and operational positions.

FIGS. 2 and 3 illustrate a multi-task window system 201 that embodies principles of the invention in another preferred form. Referring first to FIG. 2, the window system 201 comprises a window unit 202 mounted within a wall 200 of a home or other building. The wall 200 is shown in simplified partially sectioned perspective for ease of description of key components of the invention. It will be understood that the wall 200 may be constructed with any type of known building techniques such as, for example, typical frame or other construction. The window unit 202 is formed by a rectangular window frame 203 framed on the inside and outside of the wall 200 by molding 204.

A first window sash 206 and a second window sash 207 are mounted within the frame for selectively opening and closing the window. As in FIG. 1, the sashes 206 and 207 in the illustrated embodiment are common gliding sashes that slide horizontally within the window frame; however, they may be any other type of sash such as a casement sash or even a fixed window sash as found in a picture window. A top slot 208 is milled in the header of the window frame and a bottom slot is milled in the sill of the window frame. A side slot 211 is milled in the left jamb of the window frame and is contiguous with the top and bottom slots at its ends. The slots open into a substantially hollow pocket 218 (illustrated in phantom lines in FIG. 2) formed within the wall 200.

A media panel 212 is slidably installed in the window frame 203 and, in the illustrated embodiment, extends partially through the top and bottom slots 208 and 209 as shown. Alternatively, the upper end of the media panel 212 may be mounted to a track attached to the header of the window frame if desired or it may simply float without being attached to the frame at all. With this configuration, it will be appreciated that the media panel is horizontally slidable, just as in the embodiment of FIG. 1, along the length of the slots. Further, when the media panel is not in use, it may be slid completely to the left in FIG. 2 until it is hidden away out-of-sight in a storage position within the pocket 218. When so positioned, the right stile of the media panel preferably becomes co-extensive with the left jamb of the window frame to hide or disguise the slot formed therein. While a horizontally slidable media panel is illustrated and discussed herein, it should be noted that the panel may be vertically slidable or, indeed, movable in any of a number of ways between storage and operational positons.

The media panel 212 in FIG. 2 is formed from a generally rectangular frame 213 that forms the periphery of the media panel. A pair of spaced apart horizontal rails 220 extend between the two vertical stiles of the frame 213. The two horizontal rails subdivide the interior region bordered by the frame into a lower section 222, a mid section 223, and an upper section 224. In the illustrated embodiment, the lower section 222 and the upper section 224 are provided with glass panes 216, which are mounted within the frame in the traditional way. Mounted in the mid section 223 of the frame 213 is a video display 214, which preferably, but not necessarily, is a flat panel liquid crystal display commonly found in laptop and desktop personal computers.

The video display 214 receives signals from one or more sources and displays images in the usual way. The sources preferably are controlled by a computer-based controller (not shown) that itself may be connected to and control the various video devices such as, for example, a VCR, a DVD player, security cameras in and around the home, and a broadcast TV source. The control computer also may function as a traditional home computer, providing yet another source of information for display on the video display 214. Preferably, the video display 214 is of the tactile input variety such that a user may select among, for example, the video sources and computer functions simply by touching virtual buttons displayed on the screen by the control computer.

A transport mechanism such as a motorized linear actuator 219 is mounted within the pocket just below the sill of the window frame as shown. The linear actuator 219 includes a horizontally movable carriage (detailed below)

that is attached to the bottom rail of the media panel frame beneath the lower slot 209. When activated, the linear actuator causes its carriage to move horizontally, which, in turn, causes the media panel to slide horizontally between its storage position inside the pocket 218 and its operational position within the frame of the window unit as illustrated. Thus, unlike the manually slidable media panel in the embodiment of FIG. 1, the media panel in this embodiment is automatically deployed when it is needed for displaying video programming. It will be understood that the linear actuator also may be installed above the header of the window frame rather than below the sill, in which case the media panel would essentially be suspended from the actuator. It also may be installed on the side of the window frame in cases where the media panel is vertically movable rather than horizontally movable.

To reproduce the audio portion of video programming displayed on the display 214, one or more audio transducers are fixed to the glass pane 216 of the upper section of the media panel. As mentioned and described in detail in the incorporated patent disclosures, the audio transducers convert the glass pane into a flat panel sound radiator that projects sound into the room. In the illustrated embodiment, the audio transducers are hidden behind decorative elements 217 in the lower corners of the glass pane 216; however, they may be located elsewhere on the pane if desired and other means of hiding the transducers, such as a wider rail covering them, are possible and equivalent.

FIG. 3 illustrates better the automated transport mechanism for sliding the media panel between its storage and operational locations. Here, the window casing 204 and window sashes 206 and 207 are shown in phantom lines for clarity of illustration. The media panel 212, formed by frame 213, rails 220, glass panes 216, and video display 214, is illustrated midway between its storage position within the pocket 218 (FIG. 2) and its exposed operational position inside the window frame. The linear actuator 219 is shown in more detail mounted within the wall beneath the sill of the window unit. While a variety of such linear actuators are commercially available, it has been found that a model BCS10 rodless screw drive actuator available from Tool-O-Matic, Inc. functions well in prototype trials of the present invention.

The linear actuator 219 includes a carriage 227 that moves along the length of the actuator body 226 when the actuator is activated with an appropriate activation signal. More specifically, a motor 231 is mounted to a gear box 229 that, in turn, is coupled to an internal screw drive within the actuator body 226. The motor 231 is connected to a controller (which may be a simple switch or may be a more sophisticated microcontroller or computer) by means of appropriate wiring. Upon receipt of an appropriate signal from the controller, the motor rotates causing the carriage 227 to move left or right depending upon the nature of the signal. The carriage 227, in turn, is connected by brackets 228 to the bottom rail of the media panel 212. It thus will be seen that when the linear actuator is activated, its moving carriage causes the media panel 212 to move horizontally either left to its storage location or right to its operational location. Accordingly, a simple flipping of a switch or an appropriate signal from a more sophisticated controller deploys the media panel automatically when it is needed and stows it when it is not needed.

While a rodless linear actuator has been illustrated as the preferred transport mechanism and is considered to the be best mode of carrying out the invention, it will be clear to those of skill in the art that other types of transport mechanisms may be substituted with comparable results. For example, the linear actuator may be replaced with a motorized pulley system or a rack and pinion transport with similar results and these as well as other known transport mechanisms are and should be construed to be equivalent to the illustrated linear actuator.

As mentioned above, the video display 214 is connected through appropriate wiring, or through wireless communications, to one, or preferably a variety, of signal sources controlled by a computer. Thus, a homemaker, while working, for instance, at the sink of a kitchen behind which the window assembly of this invention is located, may have access to a wide variety of entertainment and information, all by appropriately activating virtual buttons on the video display screen. If it is desired to watch TV programming, this option can be selected. If there is a knock at the door, the source can be switched to a security camera so that the visitor can be identified. With security cameras inside the home, the crib of a sleeping baby's room, for instance, can be viewed on the display. Video programming from a VCR or DVD can be viewed at the touch of a virtual button. If desired, the Internet can be accessed through the display to browse websites or retrieve e-mails. During meal preparation, a data base of favorite recipes can be accessed and viewed on the display to insure perfectly prepared meals. These and other convenient functions are available with the present invention, all at the touch of a button, all without having to leave the kitchen, and all without detracting significantly from the view outside through the window. The invention also may be installed in rooms other than the kitchen to provide the same advantages elsewhere in the home.

The invention has been described herein in terms of preferred embodiments and methodologies. It will be apparent to skilled artisans, however, that a wide variety of additions, deletions, and modifications to the illustrated embodiments may be made without departing from the spirit and scope of the invention as set forth in the claims.

We claim:

1. A window assembly comprising:
  a window frame;
  at least one pane disposed in said window frame providing visibility through said window frame; and
  a media panel in said window frame, said media panel including a video display for displaying video images to a user in the vicinity of said window assembly;
  wherein:
  the media panel is capable of being moved along a window axis until at least a portion of the media panel and at least a portion of said video display extend beyond a perimeter of the window frame and are receivable into a wall adjacent to said window frame.

2. The window assembly of claim 1 wherein said media panel is slidably mounted in said window frame.

3. The window assembly of claim 2 wherein said media panel is slidable between an out-of-sight storage position and an operational position within said window frame.

4. The window assembly of claim 3 wherein said window frame is mounted in a wall having a pocket formed adjacent said window frame, some, but not all, of said media panel being disposed in said pocket when in the storage position.

5. The window assembly of claim 1 further comprising a transport mechanism capable of sliding said media panel between an out-of-sight storage position and an operational position.

6. The window assembly of claim 5 wherein said transport mechanism comprises a linear actuator.

7. The window assembly of claim 5 wherein the transport mechanism selectively slides said media panel into a pocket adjacent the window frame in the storage position and out of said pocket in the operational position.

8. The window assembly of claim 7 wherein said transport mechanism is mounted in the wall adjacent said window frame.

9. The window assembly of claim 8 wherein said transport mechanism is mounted beneath said window frame and is operationally coupled to said media panel for selectively sliding said media panel between its storage and operational positions.

10. The window assembly of claim 9 wherein said transport mechanism comprises a linear actuator.

11. The window assembly of claim 1 wherein said media panel further incorporates a sound radiator for reproducing audio portions of video displayed on said video display.

12. The window assembly of claim 11 wherein said sound radiator is a glass pane and the window assembly further comprises an audio transducer coupled to said glass pane for vibrating said glass pane to radiate sound.

13. A building comprising:
  interconnecting walls enclosing and defining rooms within said building;
  a window assembly mounted in at least one of said walls; and
  a media panel positionable in said window assembly and including a video display for displaying video information to a user in the vicinity of said window assembly;
  wherein:
    the media panel is capable of being moved along a window axis until at least a portion of the media panel and at least a portion of said video display extend beyond a perimeter of a frame of the window assembly and are receivable into said wall adjacent to said frame.

14. The building of claim 13 wherein said media panel is selectively movable between a storage position wherein said media panel does not obstruct the view through said window assembly and an operational position within the view through said window assembly.

15. The building of claim 14 further comprising a pocket formed in the wall adjacent said window assembly, some, but not all, of said media panel being disposed in said pocket when in the storage position.

16. The building of claim 13 wherein said media panel is slidably mounted in said window assembly for sliding movement into said pocket for storage and out of said pocket for use.

17. The building of claim 13 further comprising a motorized transport mechanism for selectively moving said media panel into and out of a pocket formed in the wall adjacent the window assembly.

18. The building of claim 17 wherein said motorized transport mechanism comprises a linear actuator mounted in said wall adjacent said window assembly and operatively coupled to said media panel.

19. A window assembly comprising a frame and a panel movably mounted in said frame, said panel including a video display for displaying video information to a user in the vicinity of said window assembly;
  wherein:
    the panel is capable of being moved along a window axis until at least a portion of the panel and at least a portion of said video display extend beyond a perimeter of the frame and are receivable into a wall adjacent to said frame.

20. The window assembly of claim 19 further comprising a sound radiator associated with said panel for reproducing sound corresponding to video information.

21. The window assembly of claim 20 wherein said panel is slidable in said frame between an out-of-sight storage location and a visible operational location.

22. The window assembly of claim 19 further comprising a motorized transport mechanism for moving said panel between an out-of-sight storage location and an operational location.

* * * * *